(12) United States Patent
Wu et al.

(10) Patent No.: US 12,482,179 B2
(45) Date of Patent: Nov. 25, 2025

(54) FREESTYLE ACQUISITION METHOD FOR HIGH-DIMENSIONAL MATERIAL

(71) Applicant: ZHEJIANG UNIVERSITY, Zhejiang (CN)

(72) Inventors: Hongzhi Wu, Hangzhou (CN); Kun Zhou, Hangzhou (CN); Xiaohe Ma, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 156 days.

(21) Appl. No.: 18/493,831

(22) Filed: Oct. 25, 2023

(65) Prior Publication Data
US 2024/0062460 A1 Feb. 22, 2024

Related U.S. Application Data

(63) Continuation of application No. PCT/CN2021/098576, filed on Jun. 7, 2021.

(51) Int. Cl.
| | | |
|---|---|---|
| *G06T 17/00* | (2006.01) | |
| *G06T 7/73* | (2017.01) | |
| *G06T 7/80* | (2017.01) | |
| *G06T 7/90* | (2017.01) | |
| *G06T 15/04* | (2011.01) | |
| *G06T 15/50* | (2011.01) | |

(52) U.S. Cl.
CPC ............... *G06T 17/00* (2013.01); *G06T 7/75* (2017.01); *G06T 7/80* (2017.01); *G06T 7/90* (2017.01);
(Continued)

(58) Field of Classification Search
CPC .. G06T 17/00; G06T 7/75; G06T 7/80; G06T 7/90; G06T 15/04; G06T 15/506;
(Continued)

(56) References Cited

U.S. PATENT DOCUMENTS

| | | | |
|---|---|---|---|
| 11,748,618 B2 * | 9/2023 | Wu | G06N 3/0499 |
| | | | 382/157 |
| 2016/0162760 A1 | 6/2016 | Skaff et al. | |

(Continued)

FOREIGN PATENT DOCUMENTS

| | | |
|---|---|---|
| CN | 102819864 A | 12/2012 |
| CN | 108985333 A | 12/2018 |

(Continued)

OTHER PUBLICATIONS

Japanese Office Action for Application No. 2023-558118, mailed Jul. 26, 2024 (10 pages).

(Continued)

*Primary Examiner* — Sheree N Brown
(74) *Attorney, Agent, or Firm* — Wiersch Law Group (57) ABSTRACT

A freestyle acquisition method for a high-dimensional material, belonging to the field of computer graphics and computer vision. The learning of material information is transformed into a geometric learning problem on an unstructured point cloud, and a plurality of acquisition results in different lighting and view directions form a high-dimensional point cloud, each point in the point cloud being a vector formed by an image measurement value and pose information of an object during image capture. According to the method, information of unstructured views can be effectively aggregated from the high-dimensional point cloud which is disordered, irregular, uneven in distribution and limited in precision, and the material attribute with high quality is reconstructed.

7 Claims, 5 Drawing Sheets

(52) U.S. Cl.
CPC ............ *G06T 15/04* (2013.01); *G06T 15/506* (2013.01); *G06T 2207/10024* (2013.01); *G06T 2207/10028* (2013.01); *G06T 2207/20081* (2013.01); *G06T 2207/20084* (2013.01); *G06T 2207/30244* (2013.01)

(58) Field of Classification Search
CPC . G06T 2207/10024; G06T 2207/10028; G06T 2207/20081; G06T 2207/20084; G06T 2207/30244; G06T 7/50; G06N 3/0464; G06N 3/048; G06N 3/09
USPC ......................................................... 345/426
See application file for complete search history.

(56) References Cited

U.S. PATENT DOCUMENTS

| | | | |
|---|---|---|---|
| 2017/0367766 A1* | 12/2017 | Mahfouz | A61F 2/3859 |
| 2019/0096135 A1* | 3/2019 | Dal Mutto | G06F 18/24765 |
| 2019/0108396 A1* | 4/2019 | Dal Mutto | G06N 3/047 |
| 2019/0347526 A1 | 11/2019 | Sunkavalli et al. | |
| 2020/0210726 A1* | 7/2020 | Yang | G06V 10/25 |
| 2021/0209340 A1* | 7/2021 | Wu | G06V 20/64 |

FOREIGN PATENT DOCUMENTS

| | | | | |
|---|---|---|---|---|
| CN | 109858462 A | | 6/2019 | |
| CN | 110570503 A | * | 12/2019 | ............ G06T 15/50 |
| CN | 111831808 A | | 10/2020 | |
| CN | 112256895 A | | 1/2021 | |
| CN | 110570503 B | * | 4/2021 | ............ G06T 15/04 |
| CN | 112649391 A | | 4/2021 | |
| JP | 2006277748 A | | 10/2006 | |
| JP | 2019219928 A | | 12/2019 | |

OTHER PUBLICATIONS

International Search Report (PCT/CN2021/098576); Date of Mailing: Mar. 2, 2022.

* cited by examiner

FREESTYLE ACQUISITION METHOD FOR HIGH-DIMENSIONAL MATERIAL

CROSS-REFERENCE TO RELATED APPLICATIONS

The present application is a continuation of International Application No. PCT/CN2021/098576, filed on Jun. 7, 2021, the content of which is incorporated herein by reference in their entirety.

TECHNICAL FIELD

The present application relates to a freestyle acquisition method for high-dimensional material, belonging to the fields of computer graphics and computer vision.

BACKGROUND

Digitization of real-world objects is one of the core issues in computer graphics and vision. At present, a digitized real object can be expressed by a three-dimensional grid model and a six-dimensional Spatially Varying Bidirectional Reflectance Distribution Function (SVBRDF). The digitized real object can realistically reproduce its original appearance in any view angle and lighting condition, and have important applications in cultural heritage, e-commerce, computer games, and film production.

Although high-precision geometric models can be easily obtained by commercial mobile 3D scanners, it is also desirable to develop a lightweight device for freestyle appearance scanning for the following reasons. First, as long as the pose of the camera can be estimated reliably, it can scan objects of different sizes. Second, objects that are not allowed to be transported, such as precious cultural relics, can be scanned at the scene due to the mobility of the device. In addition, it takes short time and low cost to manufacture the lightweight device, which makes it acceptable to a wider range of users. It also provides a user-friendly experience similar to geometric scanning.

Despite the surge in demand, effective non-planar appearance scanning is still a problem to be solved. On the one hand, most of the existing mobile appearance scanning work includes capturing under the condition of single point/parallel light, which leads to the low sample efficiency in the four-dimensional lighting-view domain, and prior knowledge is required to trade spatial resolution for angular precision (Giljoo Nam, Joo Ho Lee, Diego Gutierrez, and Min H Kim. 2018. Practical SVBRDF acquisition of 3D objects with unstructured flash photography. In SIGGRAPH Asia Technical Papers. 267). On the other hand, the fixed-view acquisition system depends on the fixed view conditions when the illumination changes. At present, it is not clear how to extend the fixed-view acquisition system to mobile devices, because the mobile devices have unstructured and changing views, and cannot completely cover the lighting field due to the small sizes thereof.

SUMMARY

In view of the shortcomings of the prior art, the present application provides a freestyle acquisition method for high-dimensional materials. The method can effectively utilize the acquisition condition information of each view to reconstruct high-quality object material attributes from disordered and unevenly distributed acquisition results.

The present application discloses a freestyle acquisition method for high-dimensional materials. The main idea of this method is that freestyle appearance scanning can be transformed into a geometric learning problem on unstructured point clouds, and each point in the point clouds can represent an image measurement value and the pose information of an object during image capturing. Based on this idea, the present application designs a neural network, which can effectively aggregate information in different unstructured views, reconstruct spatially independent reflection attributes, optimize the lighting patterns used in the acquisition stage, and finally obtain high-quality material reconstruction results. The present application does not depend on a specific acquisition device, a fixed object can be acquired by a person holding the device, or the object can be placed on a turntable to rotate while the device is fixed, and it is not limited to these two ways.

In this method, the learning of material information is transformed into a geometric learning problem on unstructured point clouds, and a plurality of sampling results in different lighting and view directions are combined into a high-dimensional point cloud; each point in the point cloud is a vector composed of the measured image value and the pose information of the object when the image is captured. According to this method, information of unstructured views can be effectively aggregated from the high-dimensional point cloud which is disordered, irregular, uneven in distribution and limited in precision, and the high-quality material attributes are reconstructed. The formal representation is as follows:

$$F(G(\text{high dimensional point cloud}))=m$$

where the feature extraction method G of point cloud data is not limited to a specific network structure, and other methods that can extract features from point clouds are also applicable; a nonlinear mapping network F is not limited to fully connected networks; the expression of material attributes of an object is not limited to a Lumitexel vector m.

This method includes two stages: a training stage and an acquisition stage.

The training stage includes the following steps:

(1) Calibrating parameters of an acquisition device and generating acquisition results simulating an actual camera as training data.

(2) Training a neural network by using the generated training data, in some embodiments, the neural network has the following characteristics:

(2.1) An input of the neural network is Lumitexel vectors under k unstructured samplings, where k is a number of samplings; each value of Lumitexel describes the reflected luminous intensity of a sampling point along a specific view direction when illuminated by incident light from each light source; Lumitexel has a linear relationship with a luminous intensity of the light source, which is simulated by a linear fully connected layer.

(2.2) A first layer of the neural network includes the linear fully connected layer, which is configured to simulate an lighting pattern used during an actual acquisition and transform k Lumitexels into camera acquisition results, and these k camera acquisition results are combined with pose information of the corresponding sampling point to form a high-dimensional point cloud.

(2.3) A second layer is the feature extraction network, and the feature extraction network is configured to independently extract features from each point in the high-dimensional point cloud to obtain feature vectors.

(2.4) After the feature extraction network, a max pooling layer is provided and configured to aggregate the feature vectors extracted from k unstructured views to obtain a global feature vector.

(2.5) After the max pooling layer, a nonlinear mapping network is provided and configured to reconstruct high-dimensional material information according to the global feature vector.

The acquisition stage includes the following steps:

(1) Material acquisition: constantly irradiating according to the lighting pattern, by the acquisition device, a group of photos of the target three-dimensional object obtaining under unstructured views, by the camera, and the photos are taken as the input to obtain a geometric model of the sampled object with texture coordinates and poses of the camera when taking the photos.

(2) Material reconstruction: according to the poses of the camera when taking the photos in the acquisition stage, obtaining a pose of a vertex corresponding to each effective texture coordinate on the sampled object when taking each photo; forming the high-dimensional point cloud as an input of the feature extraction network, as the second layer of the neural network, according to the acquired photos and pose information, and obtaining the high-dimensional material information through calculation.

Further, the unstructured sampling is a freestyle random sampling with a non-fixed view direction, sampling data is disordered, irregular and uneven in distribution, a fixed object can be used, and acquisition can be carried out by a person holding the acquisition device, or an object is placed on a turntable for rotation and the acquisition device is fixed for acquisition.

Further, in the process of generating the training data, when the light source is colored, it is necessary to correct a spectral response relationship among the light source, the sampled object and the camera, and a correction method is as follows:

A spectral distribution curve of an unknown color light source L is defined as $S_{c_1}{}^L(\lambda)$, where $\lambda$ represents a wavelength, $c_1$ represents one of RGB channels, and a spectral distribution curve $L(\lambda)$ of the light source with a luminous intensity of $\{I_R, I_G, I_B\}$ can be expressed as:

$$L(\lambda) = I_R S_R{}^L(\lambda) + I_G S_G{}^L(\lambda) + I_B S_B{}^L(\lambda)$$

A reflection spectrum distribution curve $p(\lambda)$ of any sampling point p is expressed as a linear combination of three unknown bases $S_{c_2}{}^P(\lambda)$ with coefficients of $p_R$, $p_G$, $p_B$ respectively, and $c_2$ represents one of the RGB three channels:

$$p(\lambda) = p_R S_R{}^P(\lambda) + p_G S_G{}^P(\lambda) + p_B S_B{}^P(\lambda)$$

The spectral distribution curve of a camera C is expressed as a linear combination of $S_{c_3}{}^C(\lambda)$; under the illumination of a light source with a luminous intensity of $\{I_R, I_G, I_B\}$, a measured value of the camera for a sampling point with a reflection coefficient of $\{p_R, p_G, p_B\}$ in a specific channel $c_3$ is as follows:

$$\int L(\lambda)p(\lambda)S_{c_3}{}^C(\lambda)d\lambda = \Sigma_{c_1,c_2} I_{c_1} p_{c_2} \delta(c_1, c_2, c_3)$$

$$\delta(c_1, c_2, c_3) = \int S_{c_1}{}^L(\lambda) S_{c_2}{}^P(\lambda) S_{c_3}{}^C(\lambda) d\lambda$$

Under an illumination condition of $\{I_R, I_G, I_B\} = \{1,0,0\}/\{0,1,0\}/\{0,0,1\}$, a color-checker with a known reflection coefficient of $\{p_R, p_G, p_B\}$ is photographed, and linear equations are established according to the measured value acquired by the camera, and a color correction matrix $\delta(c_1, c_2, c_3)$ with a size of 3×3×3 is solved to represent the spectral response relationship among the light source, the sampled object and the camera.

Further, in step (2.1) of the training stage, a relationship among an observed value B of a sampling point p on the surface of the object, a reflection function $f_r$ and the luminous intensity of each light source can be described as follows:

$$B(I, P) = \sum_l I(l) \int \frac{1}{\|x_l - x_p\|^2} \Psi(x_l, -\omega_i')V(x_l, x_p)f_r(\omega_i'; \omega_o', P)(\omega_i' \cdot n_p)^+(-\omega_i' \cdot n_l)^+ dx_l$$

where I represents the luminous information of each light source l, including: a spatial position $x_l$ of the light source l, a normal vector $n_l$ of the light source l, the luminous intensity $I(l)$ of the light source l, and P includes the parameter information of a sampling point p, including: a spatial position $x_p$ of the sampling point and material parameters n, t, $\alpha_x$, $\alpha_y$, $\rho_d$, and $\rho_s$; $\Psi(x_l, \bullet)$ describes a luminous intensity distribution of the light source l in different incident directions, V represents a binary function for visibility of $x_l$ for $x_p$, $(\bullet)^+$ is a dot product operation of two vectors; $f_r(\omega_i'; \omega_o', P)$ is a two-dimensional reflection function about $\omega_i'$ when $\omega_o'$ is fixed.

The Lumitexel vector is denoted as m(l;P).

$$m(l;P) = B(\{I(l)=1, \forall_{i \neq l} I(i)=0\}, P)$$

In the above equation, B is a representation under a single channel illumination; when the light source is a color light source, B is expanded to the following form:

$$B(I, P; c_3) = \sum_{l,c_1,c_3} I(l; c_1) \int \frac{1}{\|x_l - x_p\|^2} \Psi(x_l, -\omega_i')$$
$$V(x_l, x_p)f_r(\omega_i'; \omega_o', P, c_2)(\omega_i' \cdot n_p)^+(-\omega_i' \cdot n_l)^+ \delta(c_1, c_2, c_3) dx_l$$

where $f_r(\omega_i'; \omega_o', P, c_2)$ represents a result of $$\rho_d = \rho_{d_{c_2}}, \rho_s = \rho_{s_{c_2}}$$

in $f_r(\omega_i'; \omega_o', P)$.

Further, in the step (2.3) of the training stage, an equation of the feature extraction network is as follows:

$$V_{feature}(j) = f(\text{concat}[B(I, P^j), x_p^j, \hat{n}_p^j, \hat{t}_p^j]), 1 \leq j \leq k$$

where $f$ represents a one-dimensional convolution function, with a convolution kernel size of 1×1, $B(I, P^j)$ represents an output result of the first layer network or the acquired measured value, and $x_p^j$, $\hat{n}_p^j$, $\hat{t}_p^j$ represent a spatial position of the sampling point, a geometric normal vector of the sampling point and a geometric tangent vector in a $j^{th}$ sampling respectively, $\hat{n}_p$ is obtained by a geometric model, $\hat{t}_p$ represents an arbitrary unit vector orthogonal to $\hat{n}_p$, and $\hat{n}_p$, $\hat{t}_p$ can be transformed by the pose of the camera at the time of the $j^{th}$ sampling to obtain $\hat{n}_p^j, \hat{t}_p^j$, and $V_{feature}(j)$ represents a feature vector the network output at the time of the $j^{th}$ sampling.

Further, in the step (2.5) of the training stage, a nonlinear mapping network is formally expressed as follows:

$$y_{i+1}^d = f_{i+1}^d(y_i^d W_{i+1}^d + b_{i+1}^d), i \geq 1$$

$$y_{i+1}^s = f_{i+1}^s(y_i^s W_{i+1}^s + b_{i+1}^s), i \geq 1$$

where $f_{i+1}$ represents a mapping function of a $(i+1)^{th}$ layer network, $W_{i+1}$ represents a parameter matrix of the $(i+1)^{th}$ layer network, $b_{i+1}$ represents an offset vector of the $(i+1)^{th}$ layer network, $y_{i+1}$ represents an output of the $(i+1)^{th}$ layer network, d and s represent two branches of diffuse reflection and specular reflection respectively, and the inputs $y_1^d$ and $y_1^s$ represent global feature vectors output by the max pooling layer.

Further, a loss function of the neural network is designed as follows:

(1) A Lumitextel space is virtualized, which is a cube with a center at a spatial position $x_p$ of the sampling point, an x-axis direction of a center coordinate system of the cube is $\hat{t}_p$ and a z-axis direction is $\hat{n}_p$, $\hat{n}_p$ represents a geometric normal vector, and $\hat{t}_p$ is an arbitrary unit vector orthogonal to $\hat{n}_p$.

(2) A camera is virtualized, and the view direction represents a positive direction of the z axis of the cube.

(3) For diffuse Lumitexel, a resolution of the cube is $6 \times N_d^2$, and for specular Lumitexel, a resolution of the cube is $6 \times N_s^2$, that is, $N_d^2$ and $N_s^2$ points are evenly sampled from each face as virtual point light sources with a luminous intensity of a unit luminous intensity.

a) A specular albedo $\rho_s$ of the sampling point is set to be 0, and a diffuse reflection feature vector $\tilde{m}_d$ in this Lumitexel space is generated.

b) A diffuse albedo $\rho_d$ is set to be 0, and a specular reflection feature vector $\tilde{m}_s$ in the Lumitexel space is generated.

c) The output of the neural network are vectors $m_d$, $m_s$, where $m_d$ and $\tilde{m}_d$ have a same length and $m_s$ and $\tilde{m}_s$ have a same length, and the vectors $m_d$, $m_s$ are the predictions of the diffuse reflection feature vector $\tilde{m}_d$ and the specular reflection vector $\tilde{m}_s$.

(4) A loss function of a material feature part is expressed as follows:

$$L = \lambda_d \Sigma_l [m_d(l) - \tilde{m}_d(l)]^2 + \lambda_s \beta \Sigma_l [m_s(l) - \log(1 + \tilde{m}_s(l))]^2$$

where $\lambda_d$ and $\lambda_s$ represent the loss weights of $m_d$ and $m_s$, respectively, and a confidence coefficient $\beta$ is used to measure the loss of the specular Lumitexel, and log acts on each dimension of the vector.

The confidence coefficient $\beta$ is determined as follows:

$$\beta = \min\left(\frac{1}{\epsilon} \max_j \left[\frac{\max_l \log\left(1 + f_r(\omega_i^{j'}(l); \omega_o^{j'}, P)\right)}{\max_{\omega_i'} \log(1 + f_r(\omega_i'; \omega_o^{j'}, P))}\right], 1\right), 1 \leq j \leq k$$

where term $\max_i \log(1 + f_r(\omega_i^{j'}(l); \omega_o^{j'}, P))$ represents a logarithm of a maximum value of rendering values of all single-light sources sampled in the $j^{th}$ sampling, and term $\max_{\omega_i'} \log(1 + f_r(\omega_i'; \omega_o^{j'}, P))$ represents a logarithm of a maximum value of rendering values of single-light source theoretically available in the $j^{th}$ sampling, and $\epsilon$ represents the ratio adjustment factor.

Further, in the acquisition stage, geometric alignment is carried out after completing the material acquisition, and then material reconstruction is carried out after the geometric alignment; the geometric alignment includes: a scanned geometric model is obtained by scanning the object with a scanner, the scanned geometric model is aligned with a three-dimensional reconstructed geometric model, and the three-dimensional reconstructed geometric model is replaced with the scanned three-dimensional geometric model.

Further, for the effective texture coordinates, pixels in the photos are taken out sequentially according to the acquired photos and the pose information of the sampling points, the validity of the pixels is checked, and the high-dimensional point cloud is formed by combining the pixel value and the corresponding point pose; for a point p on the surface of the sampled object determined by the effective texture coordinates, a criterion that the $j^{th}$ sampling is valid for the vertex p is expressed as follows:

(1) A position $x_p^j$ of the vertex p is visible to the camera in this sampling, and $x_p^j$ is located in a sampling space defined when training the network.

(2) $(\omega_o' \cdot \hat{n}_p^j) > \theta$, ($\cdot$) represents a dot product operation, $\theta$ represents a lower bound of a valid sampling direction, $\omega_o'$ represents a direction of incident light in a world coordinate system, and $\hat{n}_p^j$ represents a normal vector of the vertex p of the $j^{th}$ sampling.

(3) A numerical value of each channel of the pixels in the photos is in an interval [a, b], where a and b represent lower and upper bounds of a valid sampling brightness.

When all three conditions are satisfied, it is considered that the $j^{th}$ sampling is valid for the vertex p, and a result of the $j^{th}$ sampling is added to the high-dimensional point cloud.

Further, the material parameters can be fitted after reconstructing the material information, a process of fitting is divided into two steps:

(1) Fitting a local coordinate system and a roughness: for a point p on the surface of the sampled object determined by the valid texture coordinates, the local coordinate system and the roughness in the material parameters are fitted according to a single-channel specular reflection vector output by the network by an L-BFGS-B method.

(2) Fitting albedos: the specular albedo and the diffuse albedo are solved by using a trust region algorithm, the local coordinate system and the roughness obtained in a previous process are fixed during solution, and an observed value is synthesized in the view direction used in the acquisition stage, so as to make the synthesized observed value as close as possible to an observed value obtained.

The method provided by the present application has the beneficial effects that the learning of material information is transformed into a geometric learning problem on unstructured point cloud, and a plurality of sampling results in different lighting and view directions are combined into a high-dimensional point cloud, and each point in the point cloud is a vector composed of an image measurement value and the pose information of an object during image capturing. According to this method, information of unstructured views can be effectively aggregated from the high-dimensional point cloud which is disordered, irregular, and uneven in distribution and limited in precision, and the material attributes with high quality are recovered.

DESCRIPTION OF EMBODIMENTS

In order to make the object, technical solution and advantages of the present application more clear, the present application will be described in detail with the accompanying drawings.

The present application provides a freestyle acquisition method for high-dimensional materials, which can be specifically implemented by the following steps:

I. Training Stage:

1. Training data are generated and the parameters of an acquisition device are calibrated, including the distance and direction from a light source to the origin of a sampling space, the characteristic curve of the light source, the distance and direction from a camera to the origin of the sampling space, and the intrinsic and extrinsic parameters of the camera. By using these parameters, the acquisition results for simulating actual cameras are generated as training data. The rendering model used when generating training data is a GGX model, and the generation formula satisfies:

$$f_r(\omega_i'; \omega_o', P) = \frac{\rho_d}{\pi} + \rho_s \frac{D_{GGX}(\omega_h; \alpha_x, \alpha_y) F(\omega_i, \omega_h) G_{GGX}(\omega_i, \omega_o; \alpha_x, \alpha_y)}{4(\omega_i' \cdot n)(\omega_o' \cdot n)}$$

where $f_r(\omega_i', \omega_o'; P)$ is a four-dimensional reflection function about $\omega_i', \omega_o'$, $\omega_i'$ represents the direction of incident light in a world coordinate system, $\omega_o'$ represents the direction of outgoing light in the world coordinate system, $\omega_i$ is the incident direction in a local coordinate system, $\omega_o$ is the outgoing direction in the local coordinate system and $\omega_h$ is a half-way vector in the local coordinate system. P contains the parameter information of a sampling point, including the material parameters n, t, $\alpha_x$, $\alpha_y$, $\rho_d$, $\rho_s$ of the sampling point, where n represents the normal vector in the world coordinate system, t represents the x-axis direction of the local coordinate system of the sampling point in the world coordinate system, and n and t are used for transforming the incident direction and the outgoing direction from the world coordinate system to the local coordinate system. $\alpha_x$ and $\alpha_y$ represent roughness coefficients, $\rho_d$ represents a diffuse albedo, $\rho_s$ represents a specular albedo, and $\rho_d$ and $\rho_s$ are one scalar in a single channel, and are three scalars $(\rho_{d_R}, \rho_{d_G}, \rho_{d_B})$ and $(\rho_{s_R}, \rho_{s_G}, \rho_{s_B})$ in a case of colors, $D_{GGX}$ is a micro-surface distribution term, and F is a Fresnel term, and $G_{GGX}$ represents a shadow coefficient function.

When the light source used in the acquisition is color, the spectral response relationship among the light source, the sampled object and the camera should be acquired first. The correction method is as follows: a spectral distribution curve of an unknown color light source L is defined as $S_{c_1}^L(\lambda)$, where $\lambda$ represents a wavelength, $c_1$ represents one of RGB channels, and a spectral distribution curve $L(\lambda)$ of the light source with a luminous intensity of $\{I_R, I_G, I_B\}$ can be expressed as:

$$L(\lambda) = I_R S_R^L(\lambda) + I_G S_G^L(\lambda) + I_B S_B^L(\lambda)$$

In some embodiments, a reflection spectrum distribution curve $p(\lambda)$ of any sampling point p is expressed as a linear combination of three unknown bases $S_{c_2}^P(\lambda)$ with coefficients of $p_R$, $p_G$, $p_B$ respectively, and $c_2$ represents one of the RGB three channels:

$$p(\lambda) = p_R S_R^P(\lambda) + p_G S_G^P(\lambda) + p_B S_B^P(\lambda)$$

In some embodiments, the spectral distribution curve of a camera C is expressed as a linear combination of $S_{c_3}^C(\lambda)$; under the illumination of a light source with a luminous intensity of $\{I_R, I_G, I_B\}$, a measured value of the camera for a sampling point with a reflection coefficient of $\{p_R, p_G, p_B\}$ in a specific channel $c_3$ satisfies:

$$\int L(\lambda) p(\lambda) S_{c_3}^C(\lambda) d\lambda = \Sigma_{c_1, c_2} I_{c_1} p_{c_2} \delta(c_1, c_2, c_3)$$

$$\delta(c_1, c_2, c_3) = \int S_{c_1}^L(\lambda) S_{c_2}^P(\lambda) S_{c_3}^C(\lambda) d\lambda$$

Under an illumination condition of $\{I_R, I_G, I_B\} = \{1,0,0\}/\{0,1,0\}/\{0,0,1\}$, a color-checker with a known reflection coefficient of $\{p_R, p_G, p_R\}$ is photographed, and linear equations are established according to the measured value acquired by the camera, and a color correction matrix $\delta(c_1, c_2, c_3)$ with a size of 3×3×3 may be solved to represent the spectral response relationship among the light source, the sampled object and the camera.

Figure 4:
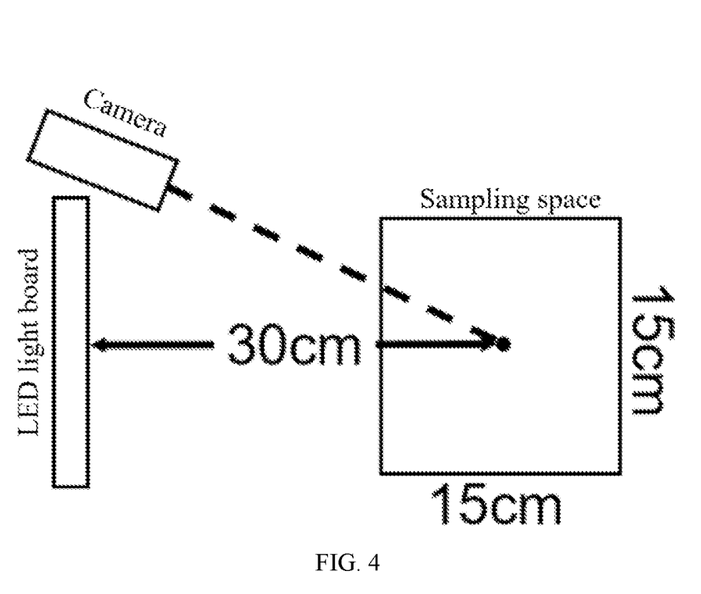
FIG. 4 is a schematic diagram of the relationship between an acquisition device and a sampling space according to an embodiment of the present application.

2. The generated training data are used to train the neural network shown in FIG. 4. The characteristics of the neural network are as follows:

(1) A relationship among an observed value B of a sampling point p on the surface of the object, a reflection function $f_r$ and the luminous intensity of each light source can be described as follows:

$$B(I, P) = \sum_l I(l) \int \frac{1}{\|x_l - x_p\|^2} \Psi(x_l, -\omega_i') V(x_l, x_p) f_r(\omega_i'; \omega_o', P)(\omega_i' \cdot n_p)^+ (-\omega_i' \cdot n_l)^+ dx_l$$

where I represents the luminous information of each light source l, including: a spatial position $x_l$ of the light source l, a normal vector $n_l$ of the light source l, the luminous intensity $I(l)$ of the light source l, and P includes the parameter information of a sampling point p, including: a spatial position $x_p$ of the sampling point and material parameters n, t, $\alpha_x$, $\alpha_y$, $\rho_d$, $\rho_s$; $\Psi(x_l, \cdot)$ describes a luminous intensity distribution of the light source l in different incident directions, V represents a binary function for visibility of $x_l$ for $x_p$, $(\cdot)^+$ is a dot product operation of two vectors, and negative values are truncated to 0; $f_r(\omega_i'; \omega_o', P)$ is a two-dimensional reflection function about $\omega_i'$ when $\omega_o'$ is fixed.

The input of the neural network is Lumitexels under k disordered and irregular samplings, where k is a number of samplings, Lumitexel is a vector, which is recorded as m(l;P); each value of Lumitexel describes the reflected luminous intensity of a sampling point along a specific view direction when illuminated by incident light from each light source.

$$m(l;P)=B(\{I(l)=1,\forall_{i\neq l}I(i)=0\},P)$$

In the above formula, B is a representation under a single channel; when the light source is a color light source, B is expanded to the following form:

$$B(I, P; c_3) = \sum_{l,c_1,c_2} I(l; c_1) \int \frac{1}{\|x_l - x_p\|^2} \Psi(x_l - \omega'_i)$$
$$V(x_l, x_p) f_r(\omega'_i; \omega'_o, P, c_2)(\omega'_i \cdot n_p)^+(-\omega'_i \cdot n_l)^+ \delta(c_1, c_2, c_3) dx_l$$

where $f_r(\omega_i';\omega_o',P,c_2)$ is a result of $$\rho_d = \rho_{d_{c_2}}, \rho_s = \rho_{s_{c_2}}$$

in $f_r(\omega_i';\omega_o',P)$ formula; B has a linear relationship with the luminous intensity of the light source and can be simulated by a linear fully connected layer.

(2) The first layer of the neural network includes a linear fully connected layer, and the parameter matrix of the linear fully connected layer is trained by the following formula:

$$W_l=f_W(W_{raw})$$

where $W_{raw}$ is a parameter to be trained; $W_l$ is an illumination matrix, and for single-channel light source, the size is 1×N, and for color light source, the size is 3×N, N is the vector length of Lumitexel; $f_W$ is a mapping and is used to transform $W_{raw}$ so that the generated illumination matrix can correspond to the possible luminous intensity of the light source; in this example, the mapping $f_W$ uses a Sigmoid function, which limits the initialization value of the illumination matrix $W_l$ of the first layer network to (0,1), but $f_W$ is not limited to the Sigmoid function.

By taking $W_l$ as the luminous intensity of a light source, k sampling observed values $B(I,P^1),B(I,P^2) \ldots B(I,P^k)$ are calculated according to the above-mentioned relation (1).

(3) A feature extraction network starts from a second layer, and features are independently extracted in k samplings to obtain feature vectors, and the formula is as follows:

$$V_{feature}(j)=f(concat[B(I,P^j),x_p^j,\hat{n}_p^j,\hat{t}_p^j]), 1\leq j\leq k$$

where $f$ is a one-dimensional convolution function, with a convolution kernel size of 1×1, $B(I,P^j)$ represents an output result of the first layer network or the acquired measured value, and $x_p^j, \hat{n}_p^j, \hat{t}_p^j$ are a spatial position of the sampling point, a geometric normal vector of the sampling point and a geometric tangent vector in a $j^{th}$ sampling respectively, $\hat{n}_p$ is obtained by a geometric model, $\hat{t}_p$ is an arbitrary unit vector orthogonal to $\hat{n}_p$, and $\hat{n}_p, \hat{t}_p$ can be transformed by the pose of the camera at the time of the $j^{th}$ sampling to obtain $\hat{n}_p^j,\hat{t}_p^j$, and $V_{feature}(j)$ is a feature vector of the network output at the time of the $j^{th}$ sampling.

(4) The feature extraction network is followed by a max pooling layer. The maxi pooling operation formula is as follows:

$$V_{feature}=max(V_{feature}(1),V_{feature}(2), \ldots ,V_{feature}(k))$$

where the max pooling operation is carried out in each dimension of $V_{feature}(1),V_{feature}(2), \ldots , V_{feature}(k)$.

(5) The max pooling layer is followed by a nonlinear mapping network:

$$y_{i+1}^d=f_{i+1}^d(y_i^d W_{i+1}^d+b_{i+1}^d), i\geq 1$$

$$y_{i+1}^s=f_{i+1}^s(y_i^s W_{i+1}^s+b_{i+1}^s), i\geq 1$$

where $f_{i+1}$ is a mapping function of a $(i+1)^{th}$ layer network, $W_{i+1}$ is a parameter matrix of the $(i+1)^{th}$ layer network, $b_{i+1}$ is an offset vector of the $(i+1)^{th}$ layer network, $y_{i+1}$ is an output of the $(i+1)^{th}$ layer network, and d and s represent two branches of diffuse reflection and specular reflection respectively, and the inputs $y_1^d$ and $y_1^s$ are $V_{feature}$.

(6) The loss function of the neural network is as follows:

(6.1) A Lumitextel space is virtualized, which is a cube with a center at the spatial position $x_p$ of the sampling point, and an x-axis direction of a center coordinate system of the cube is $\hat{t}_p$ and a z-axis direction is $\hat{n}_p$, $\hat{n}_p$ is a geometric normal vector, and $\hat{t}_p$ is an arbitrary unit vector orthogonal to $\hat{n}_p$.

(6.2) A camera is virtualized, and a view direction is a positive direction of the z axis of the cube.

(6.3) For diffuse Lumitexel, a resolution of the cube is $6\times N_d^2$, and for specular Lumitexel, the resolution of the cube is $6\times N_s^2$, that is, $N_d^2$, $N_s^2$ points are evenly sampled from each face as virtual point light sources with a luminous intensity of a unit luminous intensity; in this example, $N_d=8$, $N_s=32$.

(a) A specular albedo $\rho_s$ of the sampling point is set to 0, and a diffuse reflection feature vector $\tilde{m}_d$ in this Lumitexel space is generated.

(b) A diffuse albedo $\rho_d$ is set to 0, and a specular reflection feature vector $\tilde{m}_s$ in the Lumitexel space is generated.

(c) The output of the neural network are vectors $m_d$, $m_s$, where $m_d$ and $\tilde{m}_d$ have a same length and $m_s$ and $\tilde{m}_s$ have a same length, and the vectors $m_d$, $m_s$ are the predictions of the diffuse reflection feature vector $\tilde{m}_d$ and the specular reflection vector $\tilde{m}_s$.

(4) A loss function of a material feature part is expressed as follows:

$$L=\lambda_d \Sigma_l [m_d(l)-\tilde{m}_d(l)]^2+\lambda_2 \beta \Sigma_l [m_s(l)-\log(1+\tilde{m}_s(l))]^2$$

where $\lambda_d$ and $\lambda_s$ respectively represent the loss weights of $m_d$, $m_s$, and a confidence coefficient $\beta$ is used to measure the loss of the specular Lumitexel, and log acts on each dimension of the vector.

The confidence coefficient $\beta$ is determined as follows:

$$\beta = \min\left(\frac{1}{\epsilon}\max_j\left[\frac{\max_l \log\left(1+f_r\left(\omega_i^{j'}(l); \omega_o^{j'}, P\right)\right)}{\max_{\omega_i'} \log(1+f_r(\omega_i'; \omega_o^{j'}, P))}\right], 1\right), 1 \leq j \leq k$$

Where the term $\max_l \log(1+f_r(\omega_i^{j'}(l);\omega_o^{j'},P))$ represents a logarithm of a maximum value of rendering values of all single-light sources sampled in the $j^{th}$ sampling, and the term $\max_{\omega_i'} \log(1+f_r(\omega_i';\omega_o^{j'},P))$ represents a logarithm of a maximum value of rendering values of single-light sources theoretically available in the $j^{th}$ sampling, and $\epsilon$ is the ratio adjustment factor; in this example, $\epsilon=50\%$.

3. After the training, the parameter $W_{raw}$ of the linear fully connected layer of the network is taken out and transformed by the formula $W_l=f_W(W_{raw})$ as the lighting pattern.

II. Acquisition stage: the acquisition stage can be subdivided into a material acquisition stage, a geometric alignment stage (optional) and a material reconstruction stage.

1. Material Acquisition Stage

The acquisition device illuminates the target three-dimensional object constantly according to the lighting pattern, and the camera obtains a group of photos under unstructured views. Taking the photos as input, a geometric model of the sampled object and the pose of the camera when taking photos can be obtained by using the three-dimensional reconstruction tools open in the industry.

2. Geometric Alignment Stage (Optional)

(1) An object is scanned with a high-precision scanner to obtain a geometric model.

(2) The geometric model scanned by the scanner and the 3D reconstructed geometric model are aligned to replace the 3D reconstructed geometric model; the alignment method can be CPD (A. Myronenko and X. Song. 2010. Point Set Registration: Coherent Point Drift. IEEE PAMI 32, 12 (2010), 2262-2275. https://doi.org/10.1109/TPAMI.2010.46).

3. Material Reconstruction Stage:

(1) According to the pose of the camera when the photo is taken in the material acquisition step, the pose $x_p^j, \hat{n}_p^j, \hat{t}_p^j$ of each vertex on the sampled object when the $j^{th}$ photo is taken is obtained.

(2) Iso-charts, a tool known in the field is used to obtain a geometric model with texture coordinates for the geometric model of the sampled object obtained by three-dimensional reconstruction or the geometric model of the sampled object scanned by an aligned scanner.

(3) For the effective texture coordinates, pixels in the photos are taken out in turn according to the acquired group of photos $r_1, r_2, \ldots, r_\pi$ and the pose information of the sampling points, the validity of the pixels is checked, and the high-dimensional point cloud is formed by combining the pixel value and corresponding vertex pose $x_p, \hat{n}_p, \hat{t}_p$; as the input vector of the second layer the neural network, i.e., the feature extraction network, the output vectors $m_d$ and $m_s$ of the last layer are calculated.

For a point p on the surface of the sampled object determined by the effective texture coordinates, the criterion that the $j^{th}$ sampling is valid for the vertex p is expressed as follows:

1) A position $x_p^j$ of the vertex p is visible to the camera in this sampling, and $x_p^j$ is located in a sampling space defined when training the network.

2) $(\omega_o' \cdot \hat{n}_p^j) > \theta$, (•) is a dot product operation, $\theta$ is a lower bound of an valid sampling direction, $\omega_o'$ represents a direction of outgoing light in a world coordinate system, and $\hat{n}_p^j$ represents a normal vector of the vertex p of the $j^{th}$ sampling.

3) A numerical value of each channel of the pixels in the photos is in an interval [a, b], where a and b are lower and upper bounds of a valid sampling brightness; in this example, a=32 and b=224.

When all three conditions are satisfied, it is considered that the $j^{th}$ sampling is valid for the vertex p, and a result of the $j^{th}$ sampling is added to the high-dimensional point cloud.

(4) Fitting material parameters, which is divided into two steps:

1) Fitting Local Coordinate System and Roughness

For a point p on the surface of the sampled object determined by the effective texture coordinates, the local coordinate system and the roughness in the material parameters are fitted according to a single-channel mirror reflection vector output by the network by an L-BFGS-B method; the optimization objective is as follows:

$$\text{minimize}(\Sigma_l \| m_{s(l)} - f_r(\omega_i'; \omega_o', P) \|_2)$$

where i is the serial number of the virtual light source in (6.3), $m_s(l)$ indicates the value of the $l^{th}$ dimension of the specular reflection feature vector predicted by the network, $\omega_i'$ indicates the incident direction formed by the virtual light source with the serial number l and the sampling point, $\omega_o'$ indicates the outgoing direction formed from the sampling point to the virtual camera in (6.2), and P contains the normal vector n', tangent vector t' and other material parameter p' of the sampling point, which vary with the selected model. For example, a GGX model is used in this project, and p' includes anisotropic roughness, specular albedo and diffuse albedo. n',t',p' in the above optimization objectives are optimizable parameters.

2) Fitting Albedos

In this process, a trust region algorithm is used to solve the specular albedo and diffuse albedo, and the fitting objective satisfies:

$$\text{minimize}(\Sigma_j \| B_j - \tilde{B}_j \|_2)$$

where $\tilde{B}_j$ represents the observed value of the camera after the pixel is irradiated by the optimized lighting pattern at the $j^{th}$ view direction for fitting. $B_j$ represents the observed value synthesized by n', t' and roughness obtained in the previous process at the $j^{th}$ view direction for fitting. For the color light source, the synthesis parameters also include a corrected color correction matrix $\delta(c_1, c_2, c_3)$. The calculation process of $B_j$ is as follows:

First, the diffuse albedo is set to 1 and the specular albedo is set to 0, and the coordinate system and roughness for rendering obtained in the previous step are used to render the diffuse Lumitexel in the first view. Then set the diffuse albedo to 0 and the specular albedo to 1, and use the coordinate system and roughness obtained in the previous step to render the specular Lumitexel, $\dot{m}_j^s$ in the $j^{th}$ view direction. Two Lumitexels are connected to form a matrix $M_j = \{\dot{m}_j^d, \dot{m}_j^s\}$ with a size of N×2, where N is the number of light sources of the sampling device. The lighting pattern matrix $W_l$ with a size of 3×N used in sampling is multiplied by $M_j$ to obtain $W_l M_j$ with a size of 3×2. It is further multiplied by an optimizable variable $\rho_{d,s}$ of a size of 2×3 to obtain the following equation:

$$T = W_l M_j \rho_{d,s}$$

where the size of T is 3×3, and its copies are connected to form a tensor $\hat{T} = \{T, T, T\}$, which is summed in the last two dimensions to finally get a three-dimensional vector $B_j$. For a color light source, $\hat{T}$ should be multiplied by the color correction matrix $\delta(c_1, c_2, c_3)$ obtained by a calibration device element by element, and then summed in the last two dimensions.

Figure 1:
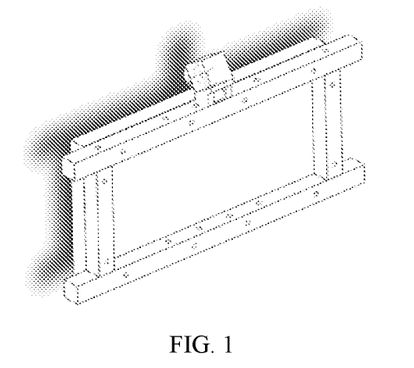
FIG. 1 is a three-dimensional schematic diagram of an acquisition device according to an embodiment of the present application.
Figure 2:
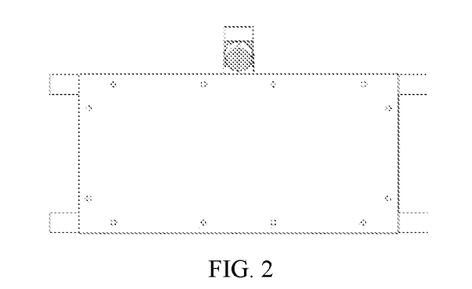
FIG. 2 is a front view of an acquisition device according to an embodiment of the present application.
Figure 3:
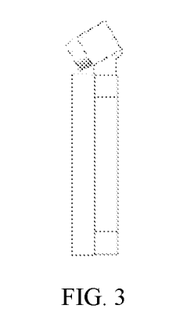
FIG. 3 is a side view of an acquisition device according to an embodiment of the present application.

Here is a concrete example of the acquisition device system, as shown in FIG. 1, which shows the system example in three dimensions, FIG. 2, which is a front view, and FIG. 3, which is a side view. The acquisition device consists of a light board with a camera fixed on the upper part for acquiring images. There are 512 LED beads densely arranged on the light board. The lamp bead is controlled by FPGA, and the luminous brightness and time can be adjusted.

Figure 6:
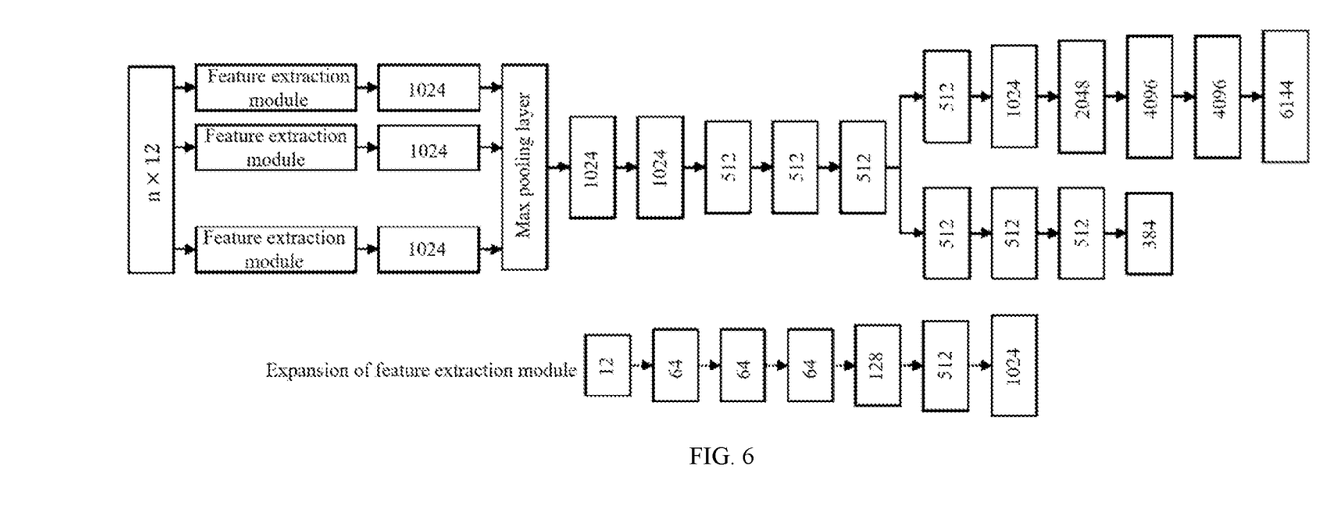
FIG. 6 is a schematic structural diagram of a neural network according to an embodiment of the present application.

An example of an acquisition system applying the method of the present application is given below, and the system is generally divided into the following modules:

A preparation module: providing data sets for network training. In this part, a GGX model is used, and a set of material parameters, pose information of k sampling points and camera positions are input to obtain a high-dimensional point cloud composed of k reflection situations. A network training part uses a Pytorch open source framework and uses an Adam optimizer for training. The network structure is shown in FIG. 6. Each rectangle represents a layer of neurons, and the numbers in the rectangle represent the number of neurons in this layer. The leftmost layer is the input layer and the rightmost layer is the output layer. The solid arrow between layers indicates full connection, and the dashed arrow indicates convolution.

An acquisition module: the device is shown in FIGS. 1, 2 and 3, and the specific structure has been described above. The size of the sampling space defined by this system and the spatial relationship between the acquisition device and the sampling space are shown in FIG. 4.

A reconstruction module: the geometric model of the sampled object obtained by three-dimensional reconstruction or the aligned geometric model of the sampled object scanned by the scanner is used to calculate the geometric model with texture coordinates, the trained neural network is loaded, the material feature vector is predicted for each vertex on the geometric model with texture coordinates, and the coordinate system and material parameters for rendering are fitted.

Figure 5:
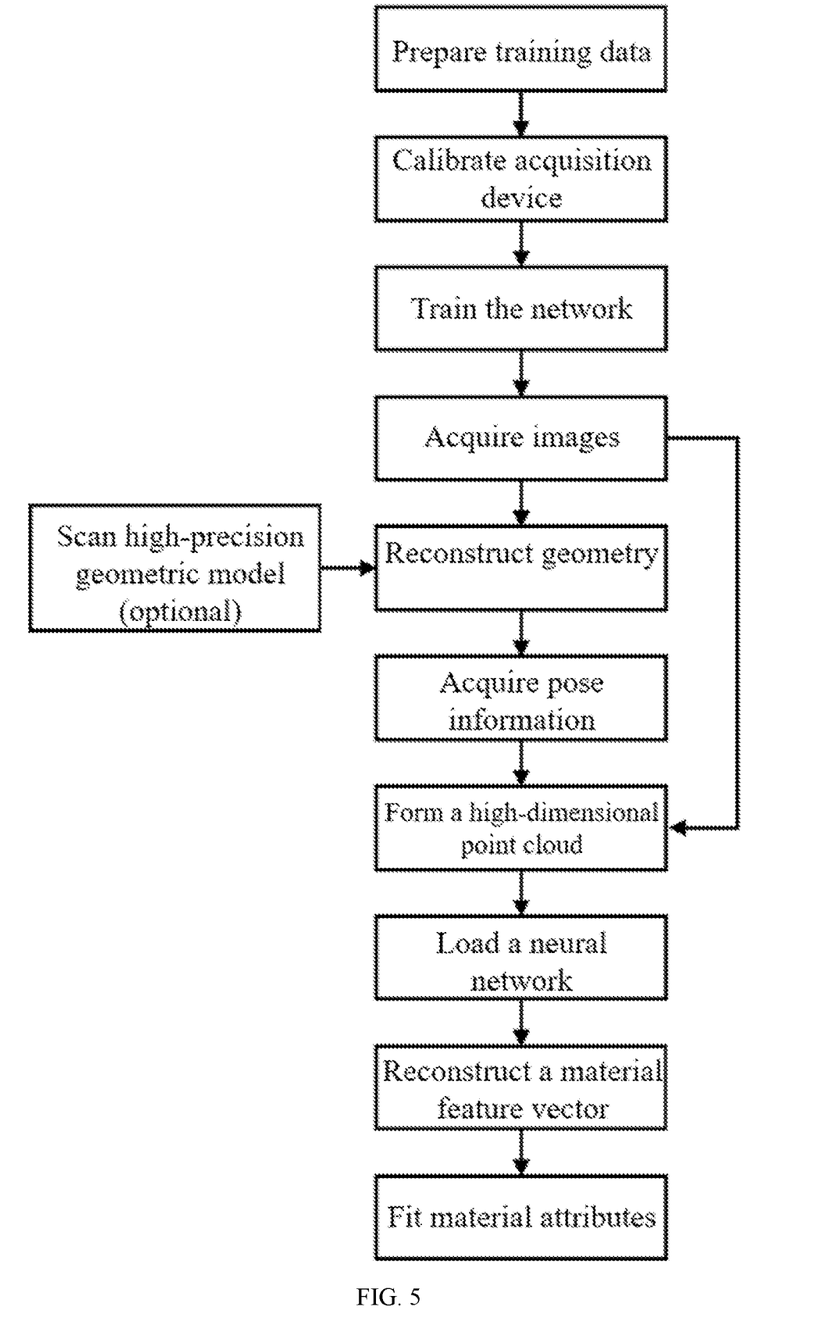
FIG. 5 is a flowchart of an acquisition method according to an embodiment of the present application.
Figure 7:
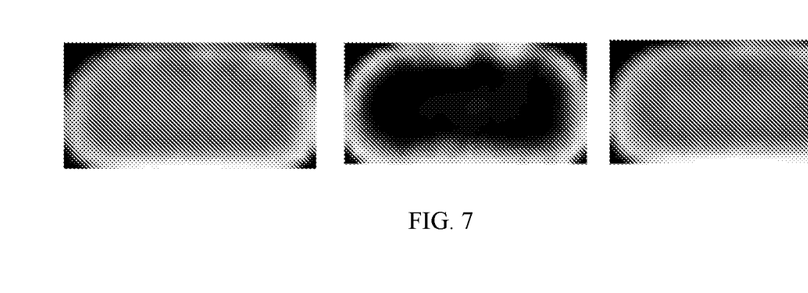
FIG. 7 is a single channel display of the lighting pattern obtained according to an embodiment of the present application, in which the gray value is used to represent the luminous intensity.

FIG. 5 is the workflow of this embodiment. Firstly, training data is generated, and 200 million sets of material parameters are obtained by random sampling, 80% of which are taken as training sets and the rest as test sets. A Xavier method is used to initialize parameters when training the network, and the learning rate is 1e−4. The lighting pattern is colorful, and the size of the lighting matrix is (3,512). The three rows of the matrix are divided into tables to represent the lighting patterns of the red, green and blue channels. After the training, the lighting matrix is taken out and transformed into the lighting pattern, and the parameters of each column specify the luminous intensity of the light source at this position. FIG. 7 shows a three-channel lighting pattern of red, green and blue obtained by network training. The next process is as follows: 1, the device is held by a hand, the light board emits light according to the lighting pattern, and the camera shoots the object at the same time to get a set of sampling results; 2, for the geometric model of the sampled object obtained by 3D reconstruction or scanned by the scanner, a geometric model with texture coordinates is obtained by using Isochart; 3, for each vertex on the geometric model with texture coordinates, the corresponding valid real shot data is found according to the pose and pixel value of the sampled photos, and a high-dimensional point cloud input is formed to reconstruct the diffuse reflection feature vector and specular reflection feature vector; 4, according to the diffuse reflection feature vector and specular reflection feature vector output by the network, an LBFGS-B method is used to fit the coordinate system and roughness for rendering for each vertex, and a trust region algorithm is used to solve the specular albedo and diffuse albedo.

Figure 8:
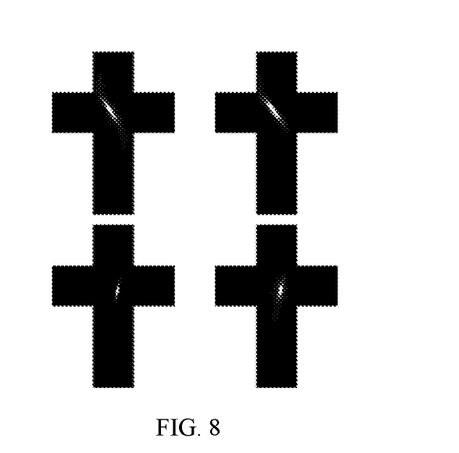
FIG. 8 is a Lumitexel vector result reconstructed by using the system according to an embodiment of the present application.

FIG. 8 shows two Lumitexel vectors in the test set reconstructed by using the above system, with one column on the left being $\tilde{m}_s$ and the corresponding column on the right being $m_s$.

Figure 9:
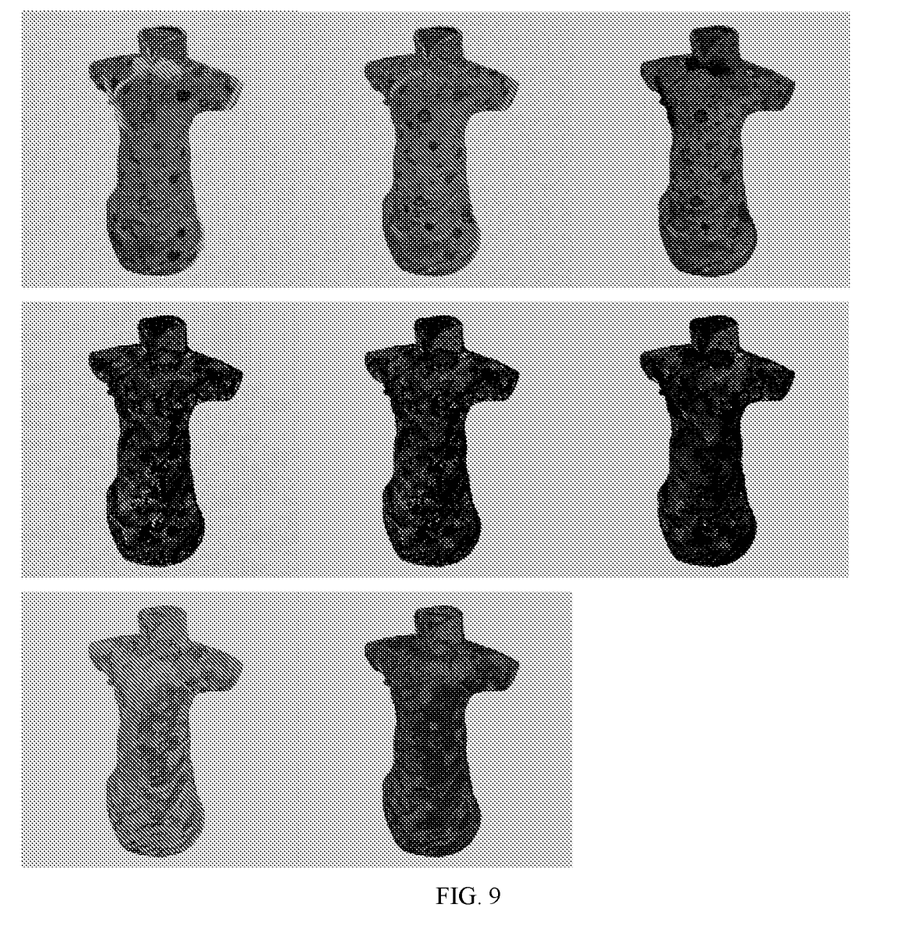
FIG. 9 is the result of the material attribute of a sampled object reconstructed by using the system according to an embodiment of the present application.

FIG. 9 shows the results of material attributes reconstructed by scanning the material appearance of the sampled object with the above system. The first line respectively represents the three components $(\rho_{d_R}, \rho_{d_G}, \rho_{d_B})$ of the sampled object, the second line respectively represents the three components $(\rho_{s_R}, \rho_{s_G}, \rho_{s_B})$ of the sampled object, and the third line respectively represents the roughness coefficients $\alpha_x$, $\alpha_y$ of the sampled object, and the gray value represents the numerical value.

The above is only a better example of implementation, and the present application is not limited to the above embodiments, so long as the technical effect of the present application is achieved by the same means, it should belong to the protection scope of the present application. Within the scope of protection of the present application, the technical solution and/or implementation thereof can have various modifications and changes.

What is claimed is:

1. A freestyle acquisition method for high-dimensional materials, comprising a training stage and an acquisition stage;
    wherein the training stage comprises:
    calibrating parameters of an acquisition device, and generating acquisition results simulating an actual camera as training data,
    wherein the parameters of the acquisition device comprises a distance and a direction from a light source to an origin of a sampling space, a characteristic curve of the light source, a distance and a direction from the camera to the origin of the sampling space, and intrinsic and extrinsic parameters of the camera; and
    and wherein a rendering model used when generating training data is a GGX model, and a generation formula satisfies:

$$f_r(\omega'_i, \omega'_o; P) = \frac{\rho_d}{\pi} + \rho_s \frac{D_{GGX}(\omega_h; \alpha_x, \alpha_y) F(\omega_i, \omega_h) G_{GGX}(\omega_i, \omega_o; \alpha_x, \alpha_y)}{4(\omega'_i \cdot n)(\omega'_o \cdot n)}$$

where $f_r(\omega'_i, \omega'_o; P)$ is a four-dimensional reflection function about $\omega'_i$, $\omega'_o$, $\omega'_i$ represents a direction of incident light in a world coordinate system, $\omega'_o$ represents a direction of outgoing light in the world coordinate system, $\omega_i$ is an incident direction in a local coordinate system, $\omega_o$ is an outgoing direction in the local coordinate system and $\omega_h$ is a half-way vector in the local coordinate system, P contains parameter information of a sampling point and comprises material parameters n, t, $\alpha_x$, $\alpha_y$, $\rho_d$, $\rho_s$ of the sampling point, where n represents a normal vector in the world coordinate system, t represents an x-axis direction of the local coordinate system of the sampling point in the world coordinate system, and n and t are used for transforming the incident direction and the outgoing direction from the world coordinate system to the local coordinate system, $\alpha_x$ and $\alpha_y$ represent roughness coefficients, $\rho_d$ represents a diffuse albedo, $\rho_s$ represents a specular albedo, and $\rho_d$ and $\rho_s$ are one scalar in a single channel, and are three scalars $(\rho_{d_R}, \rho_{d_G}, \rho_{d_B})$ and $(\rho_{s_R}, \rho_{s_G}, \rho_{s_B})$ in a case of colors, $D_{GGX}$ is a micro-surface distribution term, and F is a Fresnel term, and $G_{GGX}$ represents a shadow coefficient function; and
    training a neural network by using the generated training data, wherein the neural network has the following characteristics:
    an input of the neural network is Lumitexel vectors under k unstructured samplings, where k represents a number of samplings, each value of Lumitexel describes the reflected luminous intensity of a sampling point along a specific view direction when illuminated by incident light from each light source; wherein said Lumitexel has a linear relationship with a luminous intensity of the light source, and the linear relationship is simulated by a linear fully connected layer;

a first layer of the neural network comprises the linear fully connected layer, the linear fully connected layer is configured to simulate an lighting pattern used during an actual acquisition and transform k Lumitexel into camera acquisition results, and k camera acquisition results are combined with pose information of the corresponding sampling point to form a high-dimensional point cloud;

a second layer is a feature extraction network, and the feature extraction network is configured to independently extract features from each point in the high-dimensional point cloud to obtain feature vectors;

after the feature extraction network, a maximum pooling layer is provided and configured to aggregate the feature vectors extracted from k unstructured views to obtain a global feature vector;

after the maximum pooling layer, a nonlinear mapping network is provided and configured to reconstruct high-dimensional material information according to the global feature vector;

the acquisition stage comprises:

constantly irradiating, by the acquisition device, a target three-dimensional object according to the lighting pattern, obtaining, by a camera, a group of photos under unstructured views, and the photos are taken as an input to obtain a geometric model of the sampled object with texture coordinates and poses of the camera when taking the photos;

according to the pose of the camera when taking the photos in the acquisition stage, obtaining a pose of a vertex corresponding to each effective texture coordinate on the sampled object when taking each photo; forming the high-dimensional point cloud, and inputting the high-dimensional point cloud into the feature extraction network of the neural network obtained in the training stage to obtain the high-dimensional material information through calculation;

wherein an equation of the feature extraction network is as follows:

$$V_{feature}(j) = f(\text{concat}[B(I,P^j), x_p^j, \hat{n}_p^j, \hat{t}_p^j]), \ 1 \leq j \leq k$$

where $f$ represents a one-dimensional convolution function, with a convolution kernel size of 1×1, $B(I, P^j)$ represents an output result of the first layer network or the acquired measured value, and $x_p^j$, $\hat{n}_p^j$, $\hat{t}_p^j$ represent a spatial position of the sampling point, a geometric normal vector of the sampling point and a geometric tangent vector in a $j^{th}$ sampling, respectively, $\hat{n}_p$ is obtained by a geometric model, $\hat{t}_p$ represents an arbitrary unit vector orthogonal to $\hat{n}_p$, and $\hat{n}_p$, $\hat{t}_p$ are transformed by the pose of the camera at the time of the $j^{th}$ sampling to obtain $\hat{n}_p^j$, $\hat{t}_p^j$, and $V_{feature}(j)$ represents a feature vector of the network output at the time of the $j^{th}$ sampling;

wherein a nonlinear mapping network is formally expressed as follows:

$$y_{i+1}^d = f_{i+1}^d(y_i^d W_{i+1}^d + b_{i+1}^d), \ i \geq 1$$

$$y_{i+1}^s = f_{i+1}^s(y_i^s W_{i+1}^s + b_{i+1}^s), \ i \geq 1$$

where $f_{i+1}$ represents a mapping function of a $(i+1)^{th}$ layer network, $W_{i+1}$ represents a parameter matrix of the $(i+1)^{th}$ layer network, $b_{i+1}$ represents an offset vector of the $(i+1)^{th}$ layer network, $y_{i+1}$ represents an output of the $(i+1)^{th}$ layer network, d and s represent two branches of diffuse reflection and specular reflection, respectively, and the inputs $y_1^d$ and $y_1^s$ represent global feature vectors output by the maximum pooling layer;

and wherein a loss function of the neural network is designed as follows:

a Lumitextel space is virtualized, the Lumitexel space is a cube with a center at a spatial position $x_p$ of the sampling point, an x-axis direction of a center coordinate system of the cube is $\hat{t}_p$, and a z-axis direction is $\hat{n}_p$, $\hat{n}_p$ represents a geometric normal vector, and $\hat{t}_p$ is an arbitrary unit vector orthogonal to $\hat{n}_p$;

a camera is virtualized, and a view direction represents a positive direction of the z axis of the cube;

for diffuse Lumitexel, a resolution of the cube is $6 \times N_d^2$, and for specular Lumitexel, a resolution of the cube is $6 \times N_s^2$, $N_d^2$ and $N_s^2$ points are evenly sampled from each face as virtual point light sources with a luminous intensity of a unit luminous intensity:

a specular albedo $\rho_s$ of the sampling point is set to be 0, and a diffuse reflection feature vector $\tilde{m}_d$ in this Lumitexel space is generated;

a diffuse albedo $\rho_d$ is set to be 0, and a specular reflection feature vector $\tilde{m}_s$ in the Lumitexel space is generated;

the output of the neural network are vectors $m_d$, $m_s$, wherein $m_d$ and $\tilde{m}_d$ have a same length and $m_s$ and $\tilde{m}_s$ have a same length, and the vectors $m_d$, $m_s$ are the predictions of the diffuse reflection feature vector $\tilde{m}_d$ and the specular reflection vector $\tilde{m}_s$;

a loss function of a material feature part is expressed as follows:

$$L = \lambda_d \sum_l$$

where $\lambda_d$ and $\lambda_s$ represent the loss weights of $m_d$ and $m_s$, respectively, and a confidence coefficient $\beta$ is used to measure the loss of the specular reflection Lumitexel, and log acts on each dimension of the vector;

the confidence coefficient $\beta$ is determined as follows:

$$\beta = \min\left(\frac{1}{\epsilon}\max_j\left[\frac{\max_l \log\left(1 + f_r(\omega_i^{j'}(l); \omega_o^{j'}, P)\right)}{\max_{\omega_i'} \log\left(1 + f_r(\omega_i'; \omega_o^{j'}, P)\right)}\right], 1\right), 1 \leq j \leq k$$

where term $\max_l \log(1+f_r(\omega_i^j(l);\omega_o^j, P)$ represents a logarithm of a maximum value of rendering values of all single-light sources sampled in the $j^{th}$ sampling, term $\max_{\omega'_i} \log(1+f_r(\omega'_i; w_o^j, P))$ represents a logarithm of a maximum value of rendering values of single-light sources theoretically available in the $j^{th}$ sampling, and $\epsilon$ represents the ratio adjustment factor.

2. The freestyle acquisition method for high-dimensional materials according to claim 1, wherein the unstructured sampling is a free random sampling with a non-fixed view direction, sampling data is disordered, irregular and uneven in distribution, a fixed object is used, and acquisition is carried out by a person holding the acquisition device, or an object is placed on a turntable for rotation and the acquisition device is fixed for acquisition.

3. The freestyle acquisition method for high-dimensional materials according to claim 1, wherein in the process of generating the training data, when the light source is colored, a spectral response relationship among the light source, the sampled object and the camera needs to be corrected, and a correction method comprises:

a spectral distribution curve of an unknown color light source L is defined as $S_{c_1}^L(\lambda)$, where $\lambda$ represents a wavelength, $c_1$ represents one of RGB channels, and a spectral distribution curve $L(\lambda)$ of the light source with a luminous intensity of $\{I_R, I_G, I_B\}$ satisfies:

$$L(\lambda)=I_R S_R^L(\lambda)+I_G S_G^L(\lambda)+I_B S_B^L(\lambda)$$

a reflection spectrum distribution curve $p(\lambda)$ of any sampling point p is expressed as a linear combination of three unknown bases $S_{c_2}^p(\lambda)$ with coefficients of $p_R$, $p_G$, $p_B$ respectively, and $c_2$ represents one of the RGB channels:

$$p(\lambda)=p_R S_R^p(\lambda)+p_G S_G^p(\lambda)+p_B S_B^p(\lambda)$$

the spectral distribution curve of a camera C is expressed as a linear combination of $S_{c_3}^C(\lambda)$; under an illumination of a light source with a luminous intensity of $\{I_R, I_G, I_B\}$, a measured value of the camera for a sampling point with a reflection coefficient of $\{p_R, p_G, p_B\}$ in a specific channel $c_3$ satisfies:

$$\int L(\lambda)p(\lambda)S_{c_3}^C(\lambda)d\lambda = \sum_{c_1,c_2} I_{c_1} p_{c_2} \delta(c_1, c_2, c_3)$$

$$\delta(c_1, c_2, c_3) = \int S_{c_1}^L(\lambda)S_{c_2}^p(\lambda)S_{c_3}^C(\lambda)d\lambda$$

under an illumination condition of $\{I_R, I_G, I_B\}=\{1,0,0\}/\{0,1,0\}/\{0,0,1\}$, a color-checker with a known reflection coefficient of $\{p_R, p_G, p_B\}$ is photographed, linear equations are established according to the measured value acquired by the camera, and a color correction matrix $\delta(c_1, c_2, c_3)$ with a size of 3×3×3 is solved to represent the spectral response relationship among the light source, the sampled object and the camera.

4. The freestyle acquisition method for high-dimensional materials according to claim 3, wherein in step of the training stage, a relationship among an observed value B of a sampling point p on the surface of the object, a reflection function $f_r$ and the luminous intensity of each light source is described as follows:

$$B(I, P) = \sum_l I(l)$$

$$\int \frac{1}{\|x_l - x_p\|^2} \Psi(x_l, -\omega_i')V(x_l, x_p)f_r(\omega_i'; \omega_o', P)(\omega_i' \cdot n_p)(\omega_i' \cdot n_l)^+(-\omega_i' \cdot n_l)^+ dx_l$$

where I represents luminous information of each light source l, comprising: a spatial position $x_l$ of the light source l, a normal vector $n_l$ of the light source l, and the luminous intensity I(l) of the light source l; P comprises parameter information of a sampling point p, comprising: a spatial position $x_p$ of the sampling point and material parameters n, t, $\alpha_x$, $\alpha_y$, $\rho_d$, and $\rho_s$; $\Psi(x_l, \cdot)$ describes a luminous intensity distribution of the light source l in different incident directions, V represents a binary function for visibility of $x_l$ for $x_p$, $(\cdot)^+$ is a dot product operation of two vectors; $f_r(\omega_i'; \omega_o', P)$ is a two-dimensional reflection function about $\omega_i'$ when $\omega_o'$ is fixed;

the Lumitexel vector when the input of the neural network is k unstructured samplings is denoted as m(l; P);

$$m(l;P)=B(\{I(l)=1, V_{i\neq l}I(i)=0\}, P)$$

in the above equation, B is a representation under a single channel; when the light source is a color light source, B is expanded to the following form:

$$B(I, P; c_3) = \sum_{l,c_1,c_2} I(l; c_1) \int \frac{1}{\|x_l - x_p\|^2} \Psi(x_l, -\omega_i')$$

$$V(x_l, x_p)f_r(\omega_i'; \omega_o', P, c_2)(\omega_i' \cdot n_p)^+(-\omega_i' \cdot n_l)^+ \delta(c_1, c_2, c_3)dx_l$$

where $f_r(\omega_i'; \omega_o', P, c_2)$ represents a result of $$\rho_d = \rho_{d_{c_2}}, \rho_s = \rho_{s_{c_2}}$$

in $f_r(\omega_i'; \omega_o', P)$.

5. The freestyle acquisition method for high-dimensional materials according to claim 1, wherein in the acquisition stage, geometric alignment is carried out after completing the material acquisition, and material reconstruction is carried out after the geometric alignment; the geometric alignment comprises: a geometric model is obtained by scanning an object with a scanner, the scanned geometric model is aligned with a three-dimensional reconstructed geometric model, and the three-dimensional reconstructed geometric model is replaced with the three-dimensional scanned geometric model.

6. The freestyle acquisition method for high-dimensional materials according to claim 1, wherein for the effective texture coordinates, pixels in the photos are taken out sequentially according to the acquired photos and the pose information of the sampling points, the validity of the pixels is checked, and the high-dimensional point cloud is formed by combining the pixel value and the corresponding vertex pose; for a point p on the surface of the sampled object determined by the effective texture coordinates, a criterion that the $j^{th}$ sampling is valid for the vertex p is expressed as follows:

(1) a position $x_p^j$ of the vertex p is visible to the camera in this sampling, and $x_p^j$ is located in a sampling space defined when training the network;

(2), $(\omega_o' \cdot \hat{n}_p^j) > \theta$, ($\cdot$) represents a dot product operation, $\theta$ represents a lower bound of an valid sampling direction, $\omega_o'$ represents a direction of outgoing light in a world coordinate system, and $\hat{n}_p^j$ represents a normal vector of the vertex p of the $j^{th}$ sampling;

(3) a numerical value of each channel of the pixels in the photos is in an interval [a, b], wherein a and b represent lower and upper bounds of an valid sampling brightness;

when all three conditions are satisfied, the $j^{th}$ sampling is valid for the vertex p, and a result of the $j^{th}$ sampling is added to the high-dimensional point cloud.

7. The freestyle acquisition method for high-dimensional materials according to claim 1, wherein the material parameters is fitted after reconstructing the material information, a process of fitting is divided into two steps:

(1) fitting a local coordinate system and a roughness: for a point p on the surface of the sampled object determined by the effective texture coordinates, the local coordinate system and the roughness in the material parameters are fitted according to a single-channel specular reflection vector output by the network with an L-BFGS-B method; and (2) fitting albedos: the specular albedo and the diffuse albedo are solved by using a trust region algorithm, the local coordinate system and the roughness obtained in a previous process are fixed during solution, and an observed value is synthesized in the view direction used in the acquisition stage, so as to make the observed value as close as possible to an observed value obtained.

\* \* \* \* \*